United States Patent [19]

Fredericks et al.

[11] Patent Number: 5,333,271
[45] Date of Patent: Jul. 26, 1994

[54] METHODS AND APPARATUS FOR PERFORMING DATA CHAINING IN DATA STREAMING MODE THROUGH A CHANNEL EXTENDER

[75] Inventors: Kenneth J. Fredericks, Poughkeepsie; Thomas A. Gregg, Highland; Kenneth A. Meifert, Jr., Hopewell Junction; Anthony R. Sager, Milan; John F. Santiamo, Poughkeepsie; Clifford T. Williams, Lake Katrine, all of N.Y.

[73] Assignee: International Business Machines Corporation, Armonk, N.Y.

[21] Appl. No.: 41,121

[22] Filed: Mar. 30, 1993

Related U.S. Application Data

[63] Continuation of Ser. No. 827,551, Jan. 28, 1992, abandoned, which is a continuation of Ser. No. 345,380, Apr. 28, 1989, abandoned.

[51] Int. Cl.⁵ .............................................. G06F 13/32
[52] U.S. Cl. ............................ 395/200; 364/DIG. 1; 364/239.1; 364/251.5; 364/262.5; 364/260.1; 364/264.5
[58] Field of Search .............................. 395/650, 700

[56] References Cited

U.S. PATENT DOCUMENTS

| | | | |
|---|---|---|---|
| Re. 33,404 | 10/1990 | Milligan | 340/825 |
| 4,161,650 | 7/1979 | Caouette et al. | 250/199 |
| 4,366,478 | 12/1982 | Masuda et al. | 340/825 |
| 4,400,778 | 8/1983 | Vivian | 364/200 |
| 4,486,739 | 12/1984 | Franaszek et al. | 340/347 |
| 4,703,471 | 10/1987 | Fitelson et al. | 370/1 |
| 4,710,922 | 12/1987 | Scott | 370/112 |
| 4,712,176 | 12/1987 | Fredericks et al. | 364/200 |
| 4,742,572 | 5/1988 | Yokoyama | 455/607 |
| 4,748,656 | 5/1988 | Gibbs et al. | 364/900 |
| 4,866,609 | 9/1989 | Calta et al. | 364/200 |
| 4,939,735 | 7/1990 | Fredericks et al. | 371/47.1 |

OTHER PUBLICATIONS

IBM Patent Application Ser. No. 07/222,679, filed Jul. 21, 1988, Fredericks et al. "Information Handling System Having Serial Channel to Control Unit Link".

IBM Technical Disclosure Bulletin, vol. 19, No. 8, Jan. 1977 pp. 3139-3143 "Serial Channel to I/O Interface" Lynch et al.

IBM Technical Disclosure Bulletin, vol. 28, No. 11, Apr. 1986, pp. 4735-4736 "Format For Serial Data Frame with Wrap and Force Disable Messages and Special Handling for Mark OIn with Status In" Fredericks et al.

Primary Examiner—Kevin A. Kriess
Assistant Examiner—John Q. Chavis
Attorney, Agent, or Firm—Lawrence D. Cutter

[57] ABSTRACT

Methods and apparatus are described, in the context of an information handling system, that permit data chaining in a data streaming mode to be performed through a channel extender. The information handling system includes a processor channel and a peripheral device controller which communicate with one another over the channel extender. The invention allows the separation between the processor channel and peripheral device controller to be extended up to several (e.g. 1, 2 or 3) kilometers versus the less than 0.5 kilometer separation imposed by state of the art systems. Furthermore, the invention allows the objective of increased channel extender length to be accomplished without the risk of data overruns, chaining checks or peripheral device controller signalled errors which would otherwise occur as a result of requests for data or data transfers being in flight on an extended link.

7 Claims, 6 Drawing Sheets

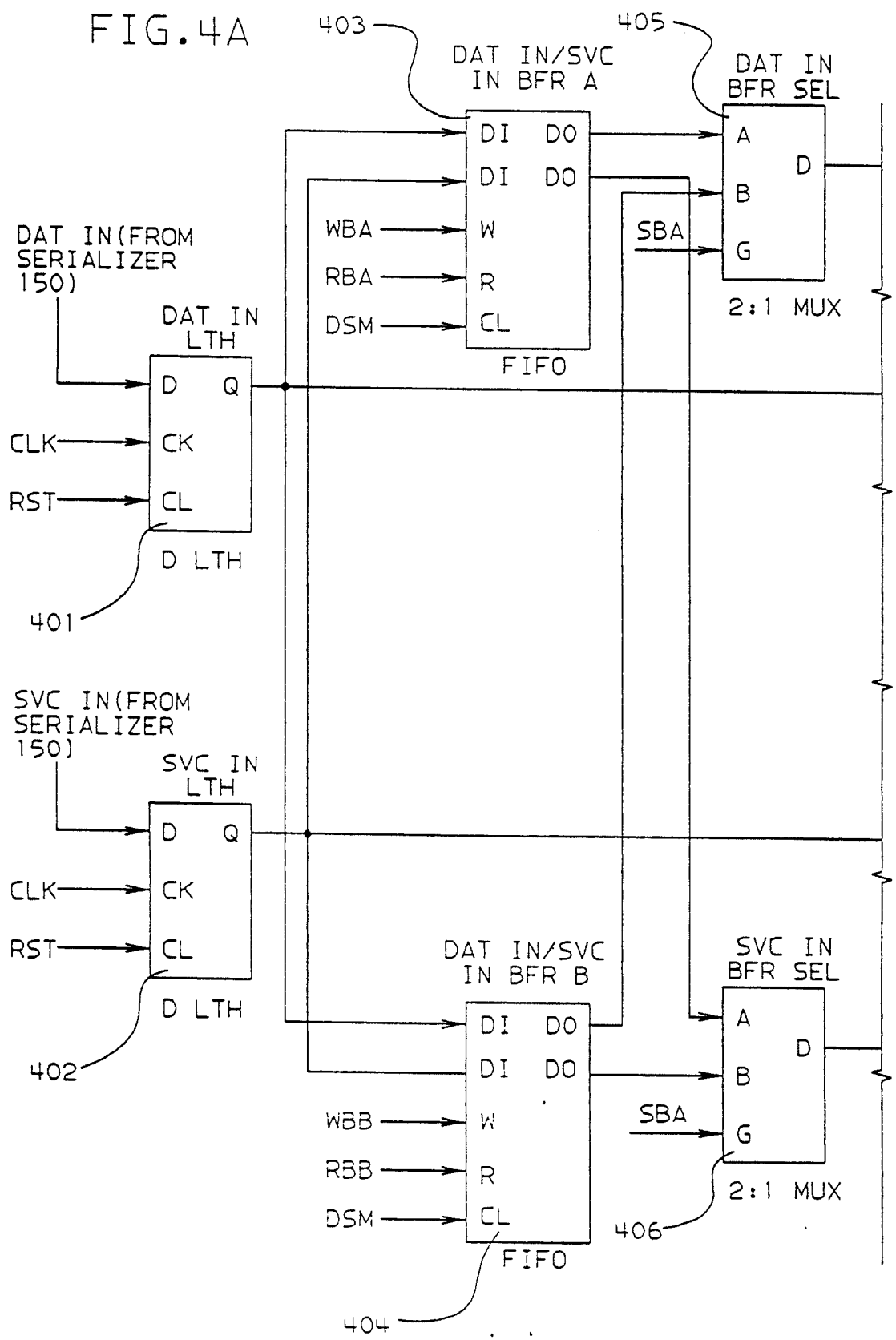

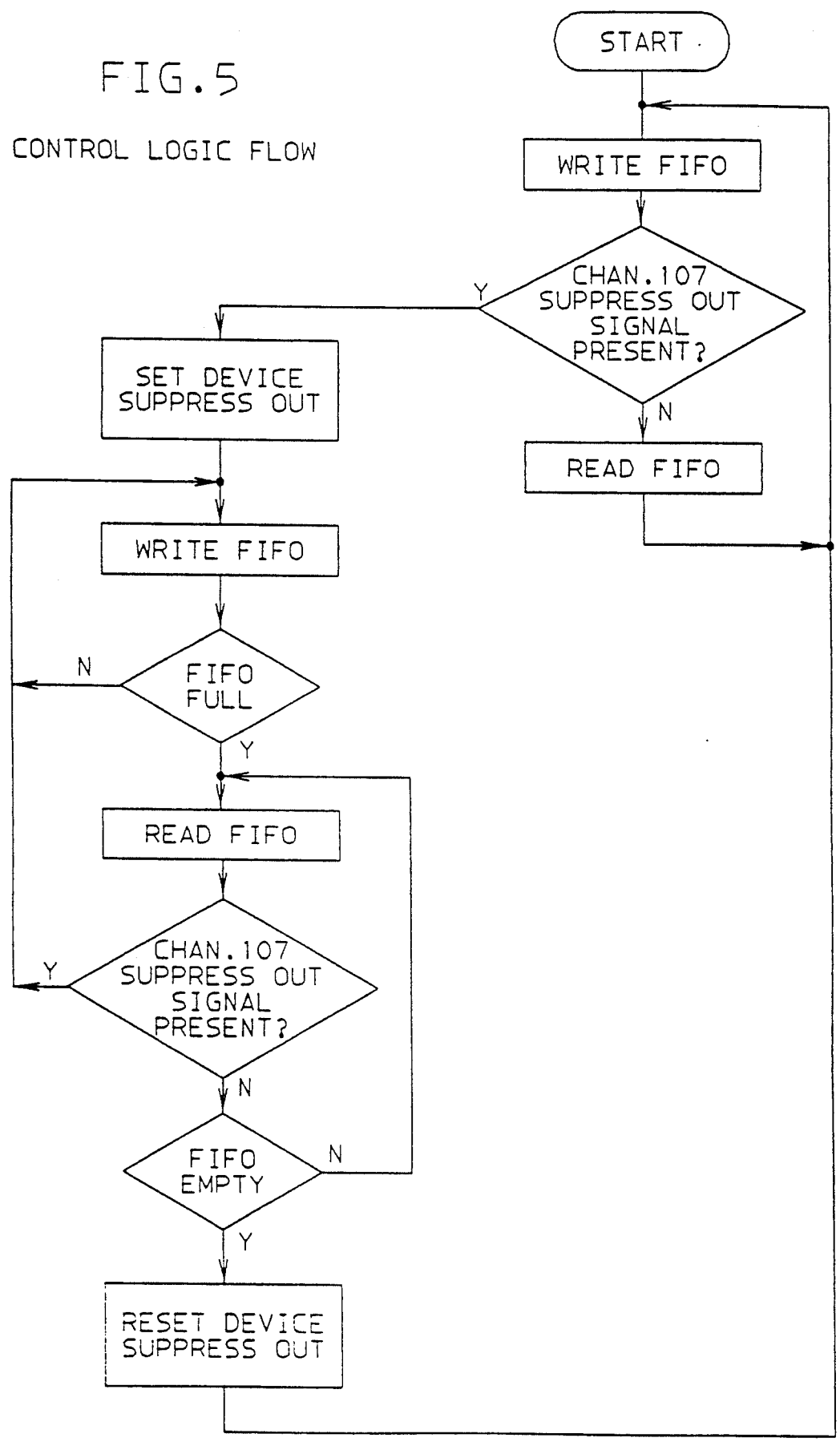

METHODS AND APPARATUS FOR PERFORMING DATA CHAINING IN DATA STREAMING MODE THROUGH A CHANNEL EXTENDER

CROSS REFERENCE TO RELATED APPLICATION

This is a continuation of copending application Ser. No. 07/827,551 filed on Jan. 28, 1992, now abandoned, which is a continuation of application Ser. No. 07/345,380, filed Apr. 28, 1989, now abandoned.

BACKGROUND OF THE INVENTION

1. Field of the Invention

The present invention relates generally to information handling systems in which data is communicated between a processor and remote peripheral devices through a channel to peripheral controller over a serial data exchange link. More particularly the present invention relates to such information handling systems where the length of the serial link is increased by using channel extenders and where data chaining may be performed using a data streaming mode of data transfer.

2. Background of the Invention

There are many information handling systems known which transmit data between a processor channel and a peripheral device across a serial data transmission link. Channel extenders are often used in these systems to increase the distance that the processor and peripheral devices may be separated. One such system is described in U.S. Pat. No. 4,712,176, hereby incorporated by reference, assigned to the assignee as the present invention.

According to the referenced patent, data transfers across the serial link are controlled by control lines called "tags", in particular the tags Service In, Service Out, Data In and Data Out as described in the reference. These tags, collectively called data transfer tags, are raised and lowered in one of several predetermined sequences that control the progress of a data transfer. The actual data being transferred is carried on buses referred to as Bus In (for data being transferred toward the processor) and Bus Out (for data being transferred to the peripheral device) in the referenced patent.

Data transfer, on one interface described in the referenced patent, takes place at different rates that are appropriate to different devices, and in the simplest case the rate is controlled by the two data transfer tags Service Out and Service In. These signals are interlocked by the requirement that the signals are changed only in the following sequence: the control unit raises Service In, the channel raises Service Out, the Control Unit drops Service In, and the Channel drops Service Out. The procedure is commonly called handshaking. The interlocked mode is also called direct current interlocked mode.

Another data transfer mode described in the U.S. Pat. No. 4,712,176 is data streaming. In this mode a channel or a control unit raises a data transfer tag for a predetermined period of time and then drops the tag without waiting for a response by the receiving component. The receiving station sends the data transfer tags as in interlocked mode except that the tags are sent on the rise of the corresponding tag without waiting for the fall of the corresponding tag. The tags are counted to check that the number of tags sent equals the number of tags received.

In a conventional I/O channel which transfers data to and from control units using the aforementioned data streaming mode, there are minimum channel command word (CCW) byte count limitations particularly when performing "data chaining" operations.

Data chaining provides the ability to transfer multiple blocks of data within a single CCW. The first CCW of the data chain string has the control unit command (e.g., read or write), data address and a byte count. The rest of the CCWs in the chain do not have a command but do have a data address and byte count. This feature allows data transfer by a single control unit command to be scattered to multiple locations in main store during read operations or be gathered from multiple locations in main store during write operations. Since the control unit receives only one command for the entire string of data chained CCWs, it has no knowledge that data chaining is taking place. In the case of a read operation, the data chaining is interlocked in that data received from one CCW must be stored in main store before the next CCW in the string can be fetched from main store. Since both data and CCWs reside in the same memory (main store) interlocking allows data received by one CCW to alter the next data chain CCW. This interlocking reduces data transfer throughput.

Since it requires a relatively long time from the store of the last byte of data for one CCW to the fetch of the next CCW, the channel requires a method of throttling data transfer from the control unit during this period. The ability of the channel to throttle data transfer ensures that the channel has the new CCW byte count necessary to determine how to respond to the control unit. When the CCW byte count is not zero, the channel responds to the control unit with Service Out or Data Out; and when the byte count of the last CCW of the string reaches zero, the channel can respond to control unit requests with a Stop command (as described in the referenced patent by raising Command Out) and inform the control unit of how many bytes were transferred by the channel.

There are situations during data chained read operations when the channel will respond to requests from the control unit while it is fetching the next CCW. In this case the channel may accept more bytes than the sum of all of the CCW byte counts in the string. When the channel detects this condition, a "chaining check" indicator is set in a status word indicating that the read operation was unsuccessful.

Using a DC Interlocked type data transfer, there are two mechanisms for throttling data transfer, both of which are able to stop data transfer within one byte. Therefore, in DC Interlock mode the smallest data chained CCW byte count can be one.

The first throttling mechanism allows the channel to simply stop responding to control unit request (Service In and Data In) while the channel is storing data for the current CCW and fetching the next CCW. Since the control unit is in DC Interlock mode, it will not present another request to the channel until a response is received for the present request. Count control is always maintained. Byte multiplexer channels typically use this mechanism.

The second mechanism is Suppress Data Control, via a mechanism like the Suppress Out tag described in the referenced patent. During data transfer the channel can raise a Suppress Out interface line as it responds to the last byte for a CCW. The control unit must stop data transfer within one byte. In this case the channel may respond to this request, and the control unit will not make any more requests until the Suppress Out line drops. Since the smallest allowed data chained CCW count is one, the channel still has count control even though it has accepted one extra byte from the control unit. Selector and Block multiplexer channels typically use this mechanism.

These two mechanism allow channel programs to be written with Read data chaining CCW byte counts of one (1). With buffered control units these programs never cause data overruns or chaining checks.

However, in data streaming mode, the control unit is not required to wait for a response from the channel before generating more requests. This mode is not interlocked; therefore, there may be multiple requests (Service In and Data In tags) and multiple responses (Service Out, Data Out, and Command Out tags) on the I/O interface cable (including optical fiber) at the same time. The number of requests and responses on the interface is called "bytes in flight", and it is determined by the data rate and the apparent length of the interface and optical cable measured in time. This number becomes very large when a channel extender is part of the interface cable. For example, with a commercially available IBM 3044 channel extender connecting a control unit operating at 1 megabyte per second at a length of 2 kilometers, the number of "bytes in flight" is about 24. With an improved channel extender operating at 4.5 megabytes per second at the same length, this number increases to about 95.

Data chaining minimum byte count limitations are directly related to the number of "bytes in flight". Neither of the throttling mechanisms described for the DC Interlock mode are able to maintain channel count control. The first mechanism where the channel stops responding to request always causes data overruns in data streaming mode. In a conventional channel, responses are always immediately answered. The only time that a channel is unable to answer a request is when a channel buffer full or empty condition exists. If a conventional channel receives a request when this condition exists, it stops responding to any more requests from the control unit. The control unit detects that the channel has stopped, raises Status In and eventually signals an overrun. This drastic action is necessary to prevent the loss of the "bytes in flight" thereby ensuring data integrity. The second mechanism (Suppress Data Control) can be used in data streaming mode however, Suppress Out cannot stop data transfer within one byte because of the "bytes in flight". The channel has no knowledge of the number of "bytes in flight" and it must receive all of the data for a CCW before it can fetch the next CCW. Once Suppress Out is raised, all of the "bytes in flight" must be acknowledged by the channel. While these bytes are being acknowledged, the channel does not have count control since it is busy fetching the next CCW. When the channel finally receives the CCW, a chaining check will result if the channel received more bytes than it has buffering space to accommodate or if the sum of all the CCW byte counts in the string is less than the number of bytes accepted by the channel. In either of these cases, the channel program does not work in Data Streaming mode even though the CCW byte counts may be relatively large.

It would be desirable to have an information handling system capable of performing data chaining in a data streaming mode through a channel extender where, for example, the distance between a processor channel and perpherial device controller could be several (e.g. 1, 2 or 3) kilometers versus the less than 0.5 kilometer separation limitation imposed by state of the art systems.

It would be further desirable to be able to achieve this objective without the risk of data overruns, chaining checks or peripheral device controller signalled errors which occur as a result of requests for data or data transfers being in flight on an extended link.

SUMMARY OF THE INVENTION

According to the invention an information handling system is described which facilitates data chaining in a data streaming mode through a channel extender without the loss of bytes or tags in flight. The invention utilizes a combination of first means for capturing bytes (and their associated data transfer tags) in flight, second means for storing and maintaining all captured bytes and data tags from the time the processor channel signals the peripheral device controller to stop sending or requesting data until the time the peripheral device controller recognizes it is to stop sending said data or requests, and third means for subsequently outputting stored data and tags to the processor under processor control.

It is an object of the invention to realize an information handling system capable of performing data chaining in a data streaming mode through a channel extender where the distance between a processor channel and perpherial device controller could exceed 1 kilometer.

It is a further object of the invention to provide an information handling system that achieves this objective without the risk of data overruns, chaining checks or peripheral device controller signalled errors directly related to the data transfer over the extended link.

The methods and apparatus described herein feature the ability to perform what will be referred to hereinafter as "In tag buffering" i.e., the ability to store requests from a control unit (Service In, Data In and the contents of Bus In) when the channel does not have CCW byte count control. The stored requests are regenerated when the channel has fetched the next CCW and this CCW's byte count is in control. The In tag buffering hardware structure, referred to hereinafter as "ITB", can be located, for example, in a channel or, in accordance with the preferred embodiment of the invention, at the channel end of the serial link in an extender box of the type described in the referenced patent. In either case the buffering hardware has essentially the same structure.

These and other objects and features of the present invention will become apparent to those skilled in the art upon consideration of the following detailed description and the accompanying Drawing, in which like reference designations represent like features throughout the figures.

BRIEF DESCRIPTION OF THE DRAWING

FIG. 5 is a flow chart depicting the function of ITB control logic needed to insure no data is lost when performing the ITB function.

DETAILED DESCRIPTION

Figure 1:
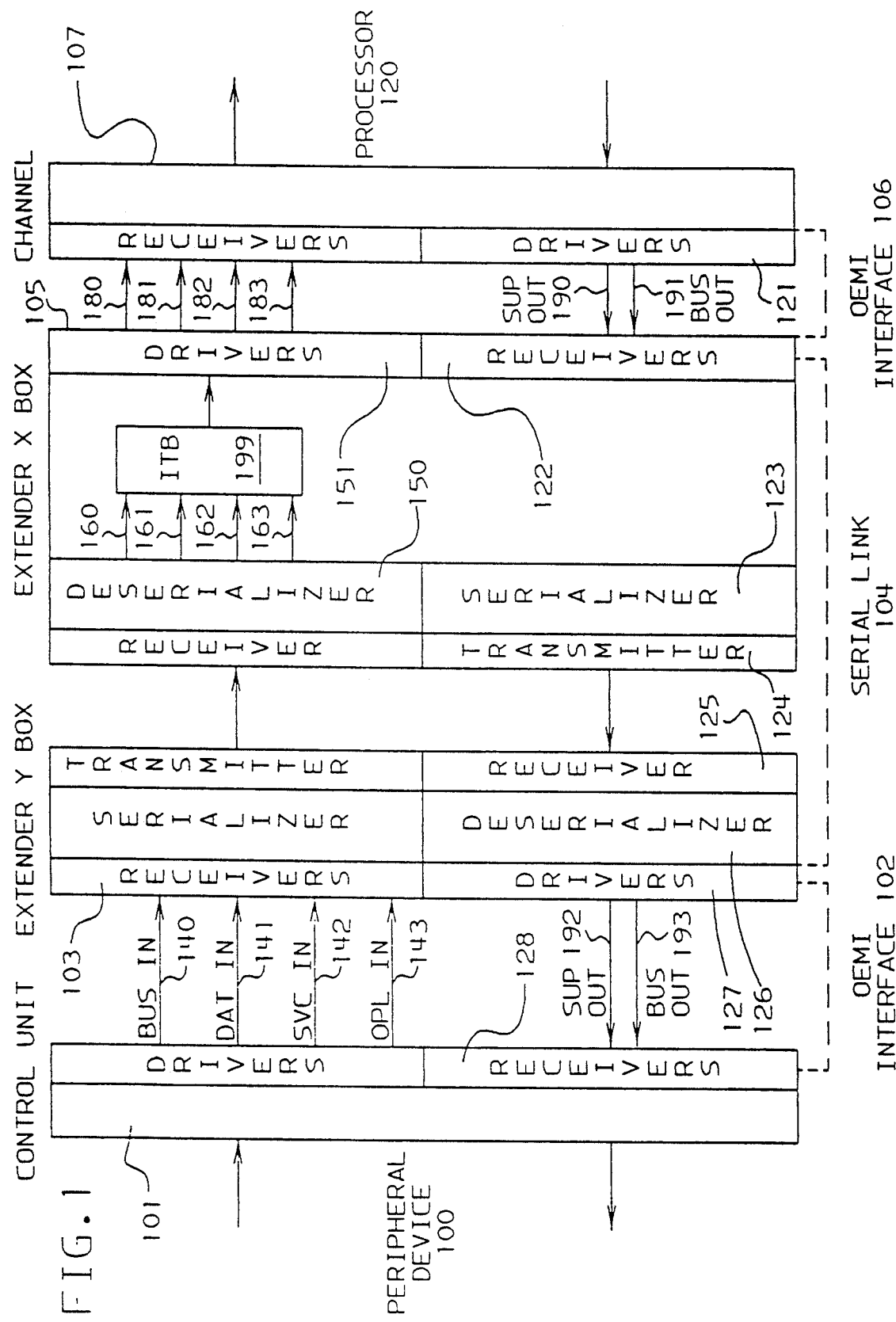
FIG. 1 depicts an overview of the preferred embodiment of the invention showing an information handling system suitable for performing data chaining in a data streaming mode where in the ITB feature of the invention is implemented in a channel extender.

FIG. 1 depicts an information handling system that incorporates the ITB function in accordance with the teaching of the invention. Peripheral Device 100 is shown coupled to processor 120 via the combination of a peripheral device control unit, 101, a standard "OEMI" interface 102, "Extender Y Box" 103, serial link 104, "Extender X Box" 105 (in which the ITB function is implemented in accordance with the preferred embodiment of the invention), OEMI interface 106 and processor channel 107. OEMI interfaces, like interface 106, are described in detail in the publication "IBM System/360 and System/370 Interface Channel to Control Unit Original Equipment Manufactures' Information", referred to in U.S. Pat. No. 4,712,176, previously incorporated herein by reference.

As for how data (and control tags) flow through the system, starting with processor 120, it can be seen that processor 120 is coupled to channel 107 and that drivers 121 in channel 107 drive data in parallel over interface 106; receivers 122 in Extender X Box 105 receive the data; the data is serialized by serializer 123 and then transmitted over serial link 104 by transmitter 124; receiver 125 takes data off the serial link at Extender Y Box 103; data is then deserialized (by deserializer 126) and then is driven (by drivers 127) onto interface 102 (in parallel) to receivers 128 in control unit 101. Finally, the parallel data is presented to peripheral device 100 from control unit 101.

The same pattern of events take place when transmitting from peripheral device 100 to processor 120, except that extender 105 is shown to include apparatus, 199, for realizing the ITB function. Unit 199 is shown located between deserializer 150 and drivers 151.

The convention used herein is that data and tags flowing towards the processor are said to flow in the "In" direction and conversely data and tags flowing toward the peripheral device are flowing in the "Out" direction. ITB 199 is shown in FIG. 1 to be located in the "In" stream and is used, as will be seen hereinafter, to buffer In tags and data flowing in towards processor 120.

Each of the blocks shown in FIG. 1 and suitable data transfer protocols, are described in the incorporated patent and will not be further described herein except to say that (1) a channel generated Suppress Output signal (SUP OUT) and a BUS OUT signal (described in the incorporated OEMI document and described more fully hereinafter), are shown communicated between channel 107 and Extender X Box 105 of FIG. 1 via links 190 and 191 respectively; (2) these same two signals are shown communicated between Extender Y Box 103 and peripheral device Control Unit 101 via links 192 and 193; and (3) BUS IN, DAT IN, SVC IN and OPL IN signals (all described in the incorporated OEMI document and described in more detail hereinafter), are shown coupled from Control Unit 101 to Extender Y Box 103 via links 140-143 respectively, are shown coupled between deserializer 150 and ITB 199 via links 160-163 respectively, and are shown coupled between Extender X Box 105 and channel 107 via links 180-183 respectively.

Figure 2:
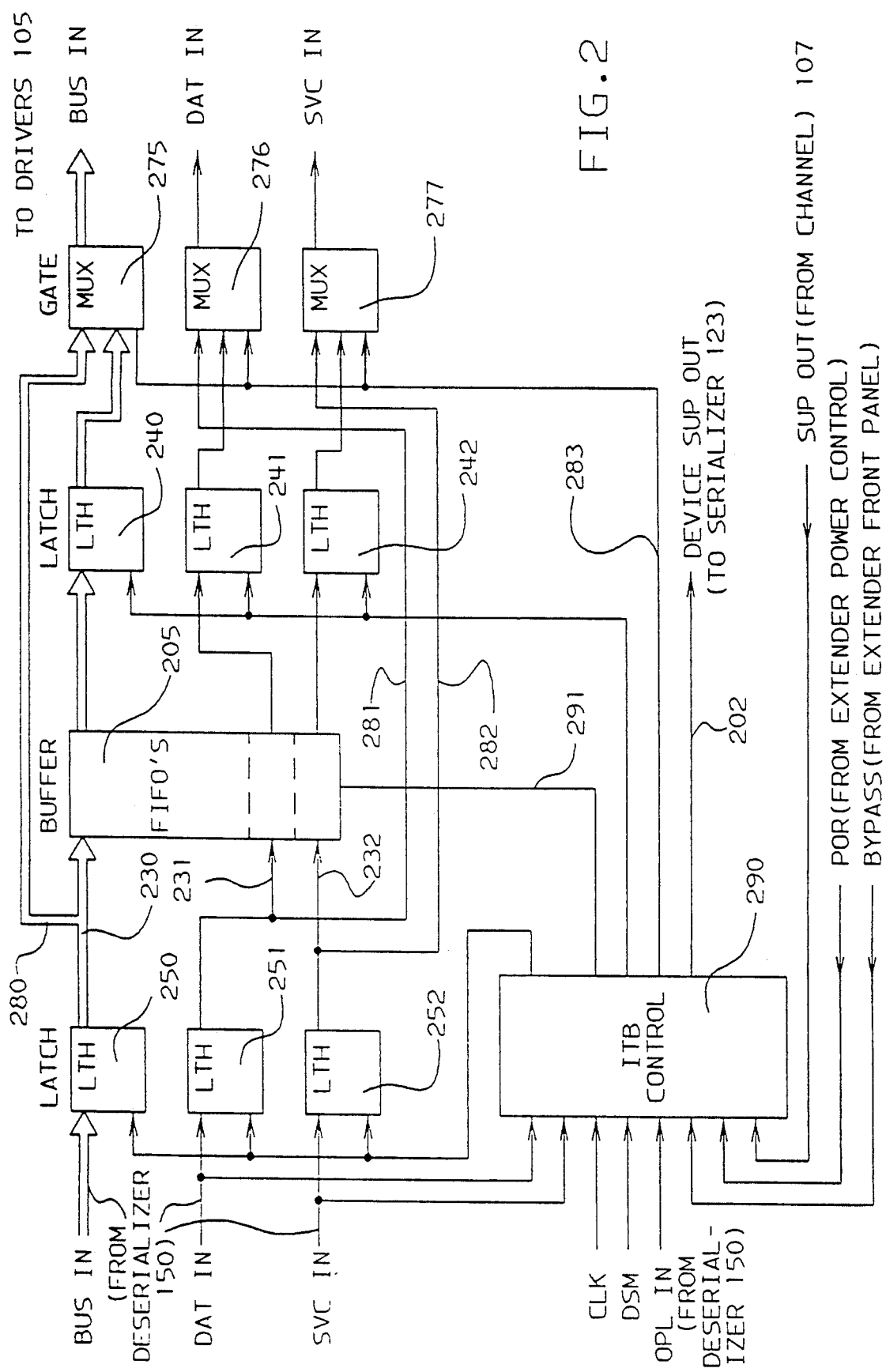
FIG. 2 is a functional block diagram indicating how to realize the ITB feature in the information handling system depicted in FIG. 1 in accordance with the teachings of the preferred embodiment of the invention.

FIG. 2 is a functional block diagram indicating a preferred way of realizing the ITB feature in the information handling system depicted in FIG. 1. In order to follow the functional description of the ITB set forth in the text hereinafter reference should be made to both FIGS. 1 and 2.

According to the preferred embodiment of the invention, the ITB buffers Bus In data, and Data In/Service In tags (only when the data transfer is in data streaming mode as indicated by the DSM input shown in FIG. 2), between extender 105's deserializer 150 and the Bus In, Data In/Service In drivers, 151, to channel 107. According to the illustrative example set forth in FIG. 2, buffering is performed utilizing a set of first in/first out (FIFO) devices, 205, which operate in a "flow through" mode under control of the Suppress Out (SUP OUT) signal from channel 107 coupled to FIFO 205 via ITB control 290 and link 291. Two sets of FIFOs can be used in an interleave mode to allow use of slower, lower cost technology.

The ITB function is, according to the illustrative example being set forth with reference to FIG. 2, held reset by the logical OR of Power On Reset (POR) from extender 105's power control or NOT Operational In (OPL IN), where OPL IN is supplied by deserializer 150 and gets inverted within ITB control 290. As long as POR is inactive, the ITB function is initiated each time that OPL IN goes active, and terminated when OPL IN goes inactive, where OPL IN active is indicative of the peripheral device being validly connected to the processor.

The Bus In (BUS IN) data, and the Data In/Service In tags (DAT IN/SVC IN) from deserializer 150 are latched (via latches 250, 251 and 252) each deserializer clock cycle (CLK), in preparation for buffering, in the case of data streaming mode; or buffer bypassing, via links 280, 281 and 282, in the case of NOT data streaming mode.

When NOT in data streaming mode, according to the illustrative example being set forth herein, the SVC IN tag is activated first, before the DAT IN tag. Independent of mode, these tags toggle back and forth and are each associated with every other byte of data on Bus In. For example, when data streaming at a 4.5 megabyte rate, the Data In and SVC IN tags are each 225 ns in duration. In this case the Bus In data and Data In/Service In tags, bypass the buffers (via links 280, 281 and 282 respectively) and are gated directly to the Bus In, Data In/Service In drivers, and on to channel 107 via MUXs 275, 276 and 277. As shown in FIG. 2 one embodiment of the invention allows the bypass mode to be selected manually via a switch on extender 105's front panel, which activates gates 275-277 via ITB control 290 and link 283.

When data streaming mode is recognized (which according to the illustrative embodiment takes place when the Data In tag is activated first), the Bus In data and the Data In/Service In tags are loaded into the buffers each deserializer clock cycle, (via links 230, 231 and 232 respectively) for subsequent unloading under control of Suppress Out.

When Suppress Out is inactive, the Bus In data, and Data In/Service In tags are unloaded from the buffers each deserializer clock cycle, and gated to the Bus In, Data In/Service In drivers to channel 107 via devices 240-242 and MUXs 275-277, as shown in FIG. 2.

When Suppress Out is active, the Bus In data, and Data In/Service In tags accumulate in the buffers until Suppress Out goes inactive, or the buffers become full, at which time the buffer unloading process begins/resumes. This is accomplished under the control of ITB control 290.

Each of the elements depicted in FIG. 2 is either available as a standard off the shelf logic component (latches, MUXs, etc.) or is well within the ability of those skilled in the art to construct in view of the foregoing functional description.

It should be noted that the only effect of the invention on the Bus In/Service In tags is to temporarily buffer them whenever the channel activates Suppress Out during data streaming data transfer. I.e., timings and content remain exactly the same as received from extender 105's deserializer 150 as described in the OEMI interface document referred to hereinbefore. The invention does not have any effect on the Bus Out, or any "Out" tags, or any "In" tags, other than Data In and Service In, in the information handling system described in the incorporated patent or herein.

Figure 3:
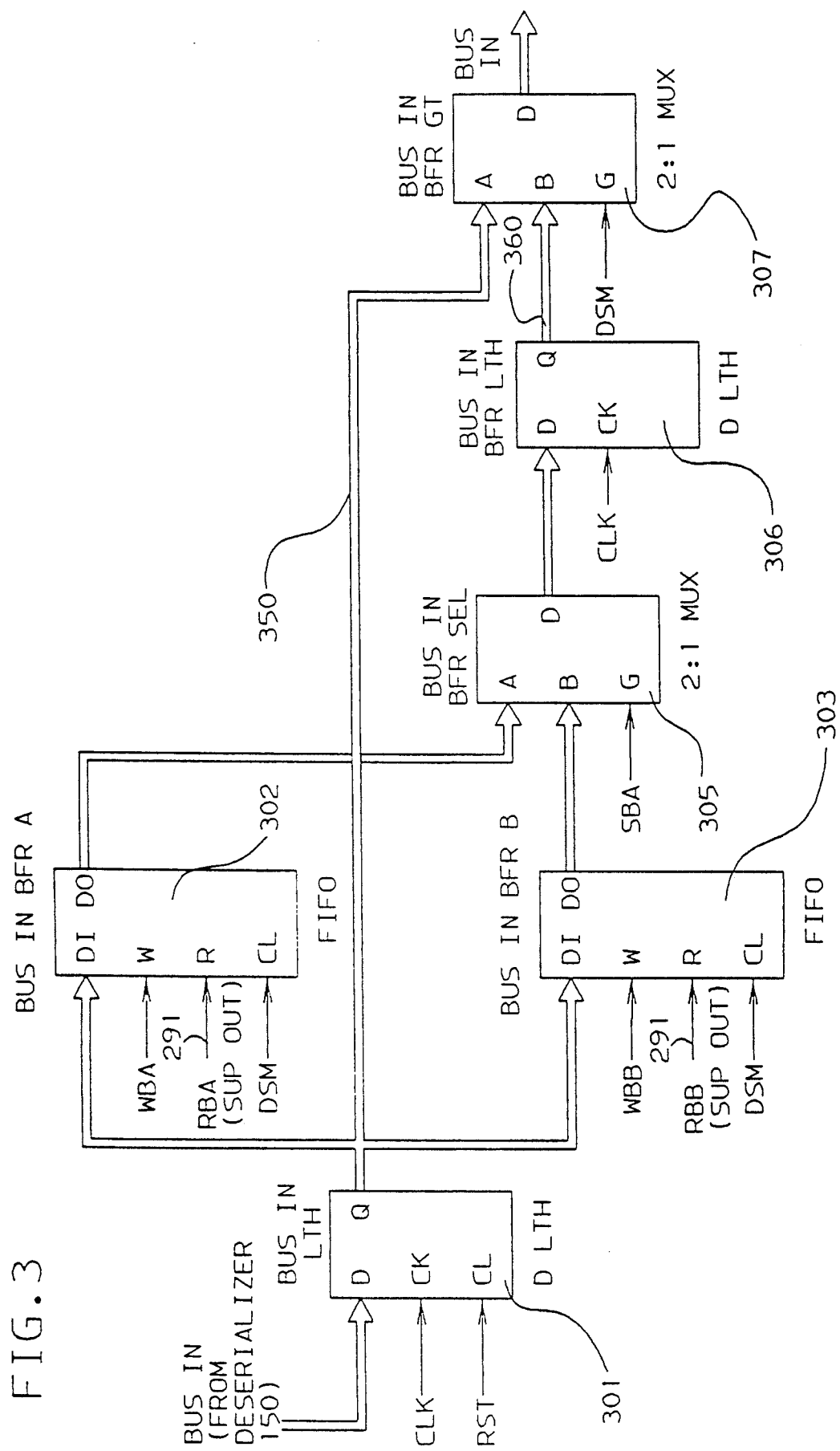
FIG. 3 depicts a "bus buffer" hardware diagram which, in accordance with the teachings of the preferred embodiment of the invention, may be used to realize a portion of the ITB functional block diagram shown in FIG. 2.

FIG. 3 depicts a "bus buffer" hardware diagram which, in accordance with the teachings of the preferred embodiment of the invention, may be used to realize a portion of the ITB functional block diagram shown in FIG. 2.

BUS IN LTH (Bus In Latch) 301, captures and holds Bus In data (BUS IN) from extender 105's deserializer 150 prior to loading it into Bus In buffers 302 and 303 (BUS IN BFR A, BUS IN BFR B), respectively. Latch 301 is held reset when the Reset control signal (RST) is active. When Reset is inactive, the Bus In data is latched each deserializer clock cycle (CLK) by latch 301.

Bus In BFR A (Bus In buffer A), sometimes referred to hereinafter as buffer 302, and Bus In BFR B (Bus In buffer B), sometimes referred to hereinafter as buffer 303, buffer Bus In data (from Bus In Latch 301) for subsequent transmission (under control of Suppress Out as will be explained hereinafter with reference to the signals RBA and RBB) to channel 107. The buffers are held reset when the data streaming mode control signal (DSM) is inactive. When data streaming mode is active, Bus In data (from Bus In Latch 301) is loaded into buffer 302 each time the Write Buffer A (WBA) control signal pulses, (for the sake of illustration, WBA pulses once every other deserializer clock cycle), and into buffer 303 each time the Write Buffer B (WBB) control signal pulses (WBB pulses alternate with WBA pulses in the illustrative embodiment being set forth).

When data streaming mode is active, Bus In data is unloaded from buffer 302 each time the Read Buffer A (RBA) control signal pulses (RBA pulses once every other deserializer clock cycle, as long as Bus In Buffer 302 contains data and Suppress Out is inactive), and from buffer 303 each time the Read Buffer B (RBB) control signal pulses (RBB pulses alternate with RBA pulses, as long as Bus In Buffer 303 contains data and Suppress Out is inactive).

BUS IN BFR SEL (Bus In Buffer Select), 305, can be realized by a 2:1 MUX which selects Bus In data unloaded from Bus In buffer 302 when the Select Buffer A (SBA) control signal is active. According to this illustrative embodiment of the invention, SBA is active during the Read Buffer A (RBA) pulse.

Unit 305 also selects Bus In data unloaded from Bus In buffer 303 when the Select Buffer A control signal is inactive. According to this illustrative embodiment of the invention SBA is inactive during the Read Buffer B (RBB) pulse.

BUS IN BFR LTH (Bus In Buffer Latch), 306, platforms Bus In data (from buffers 302 and 303 via Bus In Buffer Select 305) for transmission to channel 107. Bus In data (from unit 305) is latched each deserializer clock cycle.

Finally, FIG. 3 depicts BUS IN BFR GT (Bus In Buffer Gate), 307, which when the data streaming mode (DSM) control signal is inactive, selects Bus In data from Bus In Latch 301 directly via link 350, thereby bypassing the Bus In buffers 302 and 303. When the data streaming mode (DSM) control signal is active, unit 307 selects Bus In Data from Bus In Buffer Latch 306, i.e., selects buffered Bus In data via link 360.

Figure 4B:
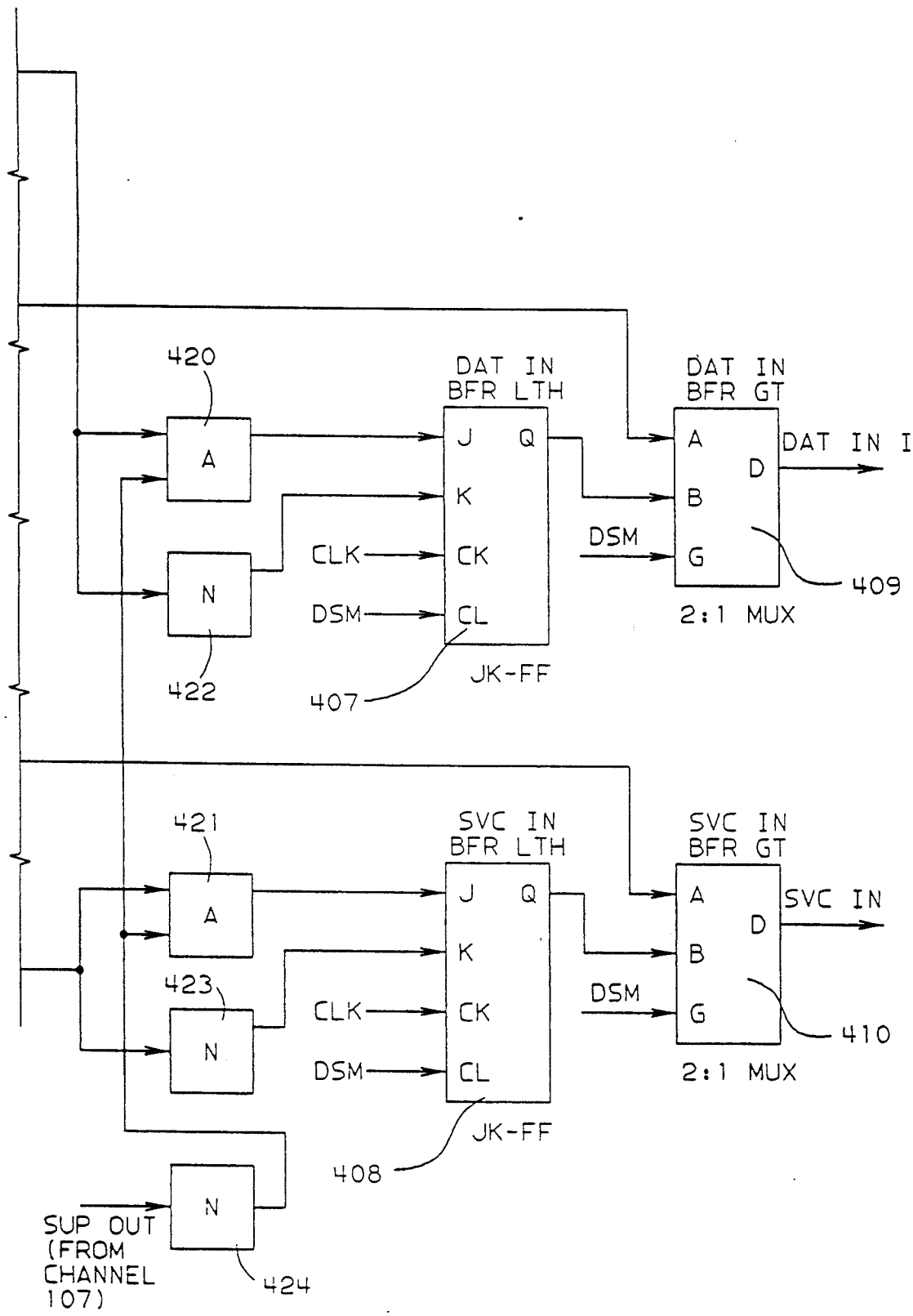
FIG. 4 depicts a "tag buffer" hardware diagram which, in accordance with the teachings of the preferred embodiment of the invention, may be used to realize another portion of the ITB functional block diagram shown in FIG. 2.

FIG. 4 depicts a "tag buffer" hardware diagram which, in accordance with the teachings of the preferred embodiment of the invention, may be used to realize another portion of the ITB functional block diagram shown in FIG. 2.

DAT IN LTH (Data In Latch), 401, and SVC IN LTH (Service In Latch), 402, platform Data In and Service In tags (DAT IN and SVC IN) from extender 105's deserializer 150 prior to loading the tags into Data In/Service In Buffers (DAT IN/SVC IN BFR A, DAT IN/SVC IN BFR B), also sometimes referred to hereinafter as buffers 403 and 404 respectively. Latches 401 and 402 are held reset when the Reset control signal (RST) is active. When Reset is inactive, the Data In and Service In tags are latched each deserializer clock cycle (CLK).

DAT IN/SVC IN BFR A (Data In/Service In Buffer A), unit 403, and DAT IN/SVC IN BFR B (Data In/Service In Buffer B), unit 404, buffer Data In and Service In tags from DAT IN and SVC IN LTH's 401 and 402, for subsequent transmission (under control of Suppress Out as previously explained hereinbefore with reference to the signals RBA and RBB) to channel 107. The buffers are held reset when the data streaming mode control signal (DSM) is inactive. When data streaming mode is active, Data In and Service In tags are loaded into buffer 403 each time the Write Buffer A (WBA) control signal pulses (WBA pulses once every other deserializer clock cycle), and into buffer 404 each time the Write Buffer B (WBB) control signal pulses (WBA pulses alternate with WBA pulses).

When data streaming mode is active, Data In and Service In tags are unloaded from buffer 403 each time the Read Buffer A (RBA) control signal pulses (RBA pulses once every other deserializer clock cycle, as long as Data In/Service In buffer 403 contains tags and Suppress Out is inactive), and from buffer 404 each time the Read Buffer B (RBB) control signal pulses (RBB pulses alternate with RBA pulses, as long as Data In/Service In buffer 404 contains tags and Suppress Out is inactive).

DAT IN BFR SEL (Data In Buffer Select), 405, and SVC IN BFR SEL (Service In Buffer Select), 406, (preferably realized as 2:1 MUXs) select Data In and Service In tags unloaded from buffer 403 when the Select Buffer A (SBA) control signal is active (SBA is active during the during the Read Buffer A (RBA) pulse). Units 405 and 406 select Data In and Service In tags unloaded from buffer 404 when the Select Buffer A (SBA) control signal is inactive (SBA is inactive during the Read Buffer B (RBB) pulse).

DAT IN BFR LTH (Data In Buffer Latch) 407 and SVC IN BFR LTH (Service In Buffer Latch) 408, (preferably realized by JK flip flops under the control of AND gates 420 and 421, inverters 422 and 423 and the Suppress Output signal (SUP OUT) from channel 107, shown inverted by inverter 424) platform Data In and Service In tags (from buffers 403 and 404 via units 405 and 406) for transmission to channel 107. Data In and Service In tags are latched each deserializer clock cycle.

FIG. 4 goes on to show DAT IN BFR GT (Data In Buffer Gate) 409 and SVC IN BFR GT (Service In Buffer Gate, 410. When the data streaming mode (DSM) control signal is inactive, units 409 and 410 select Data In and Service In tags from latches 401 and 402 (bypassing Data In/Service In buffers 403 and 404). When the Data Streaming Mode (DSM) control signal is active, units 409 and 410 select Data In and Service In tags from latches 407 and 408 (buffered Data In/Service In tags).

To complete the detailed description of how to implement the invention, synchronizing the read/write circuitry of the memory scheme being used must be considered. The problem that occurs is that the buffer memory space available can be overrun causing bytes to be lost under two conditions. The first is caused by a suppress out which is active for longer than the time required to fill the entire buffer memory. There is no restriction on the length of time that a channel can hold suppress out up. The second is multiple suppress out sequences resulting in a buffer memory overrun. An example of this scenario is shown below.

| CCW | FLAGS | LENGTH OF SUPPRESS OUT |
|---|---|---|
| 1 | RD | 25 u seconds |
| 2 | Chain Data | 25 u seconds |
| 3 | Chain Data | 25 u seconds |

In this example, each time suppress out is active, the buffer memory is written into but not read (the read will occur when SUP OUT becomes inactive or when the FIFO is filled). Therefore after CCW 3, there has been 75 u seconds worth of data written to the memory without having been read. If, for example, the memory is only 50 u seconds deep, the data for CCW 3 would be lost. This would prohibit the implementation of an ITB function since a CCW chain can be N CCW's long and this would then dictate that the memory would have to be N u seconds deep which is impossible to implement.

This requires that the ITB implementation be independent of the length of channel suppress out and also be capable of handling multiple chain data CCW's up to a total of N. This can be accomplished, according to one embodiment of the invention, by control logic that synchronizes FIFO writes and reads based on the rising edge of channel suppress out. For each channel suppress out, the FIFO is written until it is full and then read until is it empty. During this period of time the suppress out at the control unit is held active independent of the channel suppress out. The device SUP OUT signal (i.e., the SUP OUT signal from the control circuit) is shown output from ITB control circuit 290 (via link 202 in FIG. 2), and is set whenever the SUP OUT signal from channel 107 is present. The device SUP OUT signal is reset only when the FIFO is empty, as will be explained hereinafter. This guarantees that the pipeline between the channel unit and the control unit will be drained prior to inhibiting the FIFO writes and allowing the FIFO reads. This insures that no data is lost. The FIFO's must be of sufficient depth to guarantee that the time to write the FIFO full is greater than the time required to drain the pipeline between the channel unit and the control unit.

FIG. 5 is a flow chart depicting the operation of ITB control logic suitable for insuring no data is lost when performing the ITB function.

As seen in FIG. 5, the FIFO is written into, then read, written into, etc. for so long as the channel suppress out signal is not active. When active, the peripheral device controller Suppress Out is set, and writes to the FIFO continue until full. When full, the FIFO is read to prevent data loss. After the read out, if the channel Suppress Out signal is present, writes to the FIFO continue. If the channel suppress signal is not present, and the FIFO is not empty, it is read, until emptied. Finally, upon emptying the FIFO, the peripheral device controller Suppress Out is reset. Those skilled in the art will readily appreciate that standard, off the shelf control logic may be used to implement the functions depicted in FIG. 5.

A further implementation detail of importance is to allow any data and associated tags active at the time of Suppress Out going active, i.e., data or tags being read from the FIFOs, to be completely read out prior to inhibiting the FIFO reads. The preferred embodiment of the invention is implemented in this fashion to prevent "chopping" of a read by the activation of Suppress Out.

The detailed description of the invention set forth hereinabove demonstrate that the ITB is suitable for achieving the stated objectives of the invention. Utilizing ITB apparatus and methodology, data chaining in data streaming mode through a channel extender, can be implemented without suffering from the overrun, chaining errors, etc., that occur in prior art systems that attempt to "stretch" the distance between peripheral devices and a processor.

It should be apparent to those skilled in the art that one means of varying channel extension capabilities to fit a particular application, using the ITB mechanism, is to deepen the ITB buffers. Obviously, design trade off considerations such as cost, speed, etc. go into the selection of buffer size. These considerations do not in any way limit the scope of the invention.

The foregoing description of a preferred embodiment of the novel methods and apparatus has been presented for the purposes of illustration and description only. It is not intended to be exhaustive or to limit the invention to the precise form disclosed, and obviously many modifications and variations are possible in light of the above teaching.

The embodiment and examples set forth herein were presented in order to best explain the principles of the instant invention and its practical application to thereby enable other skilled in the art to best utilize the instant invention in various embodiments and with various modifications as are suited to the particular use contemplated.

It is intended that the scope of the instant invention be defined by the claims appended hereto.

What is claimed is:

1. In an information handling system having a processor channel, a controller for controlling a peripheral device and operated by said processor channel for performing data transfers, including data bytes and data transfer tags, between said processor channel and said controller in a data streaming mode, a circuit for generating a Data Streaming Mode (DSM) signal which is active when a data transfer is in the data streaming mode and inactive when said data transfer in not in the data streaming mode, said channel controller generating a Suppress Out (SO) signal which is active when said controller is to stop a data transfer to said processor channel and inactive when said controller may perform a data transfer to said processor channel, an In Tag Buffer (ITB) apparatus comprising:

a data link between said processor channel and said controller forming a pipeline through which data bytes and data transfer tags flow from said controller to said processor channel during a data transfer;

latch means having an input connected to said pipeline and an output, said latch means for latching data bytes and their associated data transfer tags flowing through said pipeline from said controller;

ITB control means connected to said processor channel for receiving said SO signal and sending a Device Suppress Out (DSO) signal to said controller which is active when said SO signal is active, said active DSO signal for stopping the data transfer from said controller when received by said controller;

storage means having an input connected to the output of said latch means, an output, a first control terminal connected to said channel for receiving said SO signal, and a second control terminal connected to said circuit for receiving said DSM signal, said storage means draining said pipeline and storing data bytes and their associated data transfer tags therein when said SO signal is active, said data bytes and their associated transfer tags being written into and read out of said storage means when said DSM signal is active and said SO signal is inactive; and gate means having an input connected to the output of said storage means, an output connected to said processor channel, and a control terminal connected to said circuit for receiving said DSM signal, said gate means for transferring said data bytes and their associated data transfer tags from said storage means to said processor channel when said DSM signal is active.

2. The ITB apparatus of claim 1 wherein said storage means is of sufficient depth to drain said pipeline and store all data bytes and their associated data transfer tags in said pipeline while said SO signal is active.

3. The ITB apparatus of claim 1 wherein said gate means has a second input connected to the output of said latch means, said second input being selected when said DSM signal is inactive, thereby forming a bypass of said storage means and transferring said data bytes and their associated data transfer tags from said latch means to said processor channel when said DSM signal is inactive.

4. The ITB apparatus of claim 1 wherein said ITB control means includes:

full determining means for determining if said storage means is full after writing a data byte and its associated data transfer tag thereinto when said SO signal is active;

reading means for reading data bytes and associated data transfer tags out of said storage means to said gate means when said full determining means determines that said storage means is full;

SO determining means for determining if said SO signal is active after a data byte and its associated data transfer tag is read from said storage means by said reading means;

writing means for writing a data byte and its associated data transfer tag into said storage means from said pipeline when said SO determining means determines that said SO signal is still active;

empty determining means for determining when said storage means becomes empty when read from by said reading means after said SO determining means determines that said SO signal is not active; and means for resetting said DSO signal to the inactive state after said empty determining means determines that said storage means is empty, thereby allowing multiple chain data transfers from said controller to said processor channel through said pipeline.

5. In an information handling system having a processor channel, a controller for controlling a peripheral device and operated by said processor channel for performing data transfers, including data bytes and data transfer tags, between said processor channel and said controller in a data streaming mode, a circuit for generating a Data Streaming Mode (DSM) signal which is active when a data transfer is in the data streaming mode and inactive when said data transfer in not in the data streaming mode, said channel controller generating a Suppress Out (SO) signal which is active when said controller is to stop a data transfer to said processor channel and inactive when said controller may perform a data transfer to said processor channel, a method comprising:

establishing a data link between said processor channel and said controller, said data link forming a pipeline through which data bytes and data transfer tags flow from said controller to said processor channel during a data transfer;

latching in a latching means connected to said pipeline, data bytes and their associated data transfer tags flowing through said pipeline from said controller;

receiving said SO signal by an In Tag Buffer (ITB) control means connected to said processor channel;

sending an active Device Suppress Out (DSO) signal from said ITB control means to said controller when said SO signal is active;

stopping the data transfer from said controller when said active DSO signal is received by said controller;

providing a storage means having an input connected to the output of said latch means, an output, a first control terminal connected to said channel for receiving said SO signal, and a second control terminal connected to said circuit for receiving said DSM signal;

draining data bytes and their associated data transfer tags from said pipeline into said storage means when said SO signal is active;

both writing into and reading out of said storage means, data bytes and their associated data transfer tags when said DSM signal is active and said SO signal is inactive;

providing gate means having an input connected to the output of said storage means, an output connected to said processor channel, and a control terminal connected to said circuit for receiving said DSM signal; and transferring through said gate means, said data bytes and their associated data transfer tags from said storage means to said processor channel when said DSM signal is active.

6. The method of claim 5 further comprising:

providing said gate means with a second input connected to the output of said latch means, said second input being selected when said DSM signal is inactive, thereby forming a bypass of said storage means; and transferring said data bytes and their associated data transfer tags from said latch means to said processor channel when said DSM signal is inactive.

7. The method of claim 5 further comprising;

determining if said storage means is full after writing a data byte and its associated data transfer tag thereinto when said SO signal is active;

reading a data byte and its associated data transfer tag out of said storage means to said gate means when said storage means is determined to be full;

determining if said SO signal is active after data is read from said storage means;

writing a data byte and is associated data transfer tag into said storage means from said pipeline when said SO signal is determined to be still active;

reading one or more data bytes and associated data transfer tags out of said storage means to said gate means when said SO signal is determined to be not;

determining when said storage means becomes empty; and resetting said DSO signal to the inactive state after said storage means is determined to be empty, thereby allowing multiple chain data transfers from said controller to said processor channel through said pipeline.

* * * * *